(12) United States Patent
Gordon

(10) Patent No.: US 8,387,836 B2
(45) Date of Patent: Mar. 5, 2013

(54) ROD ACTIVATED VALVE FOR SAVING WATER WITH TAMPER-RESISTANT SECURITY FEATURE

(75) Inventor: Steven Gordon, St. Pete Beach, FL (US)

(73) Assignee: Instant-Off, Inc., Clearwater, FL (US)

( * ) Notice: Subject to any disclaimer, the term of this patent is extended or adjusted under 35 U.S.C. 154(b) by 94 days.

(21) Appl. No.: 13/154,634

(22) Filed: Jun. 7, 2011

(65) Prior Publication Data

US 2011/0240900 A1    Oct. 6, 2011

Related U.S. Application Data

(63) Continuation-in-part of application No. 12/109,967, filed on Apr. 25, 2008, now Pat. No. 7,975,985.

(51) Int. Cl.
*F16K 31/00* (2006.01)

(52) U.S. Cl. ......... 222/509; 239/583; 251/337; 251/339

(58) Field of Classification Search .......... 251/337, 251/339, 229, 230, 319, 900; 137/801; 4/678; 222/509; 119/72; 239/583
See application file for complete search history.

(56) References Cited

U.S. PATENT DOCUMENTS

| | | | | |
|---|---|---|---|---|
| 3,124,157 A * | 3/1964 | Krzewina | ...................... | 137/583 |
| 4,506,862 A * | 3/1985 | Spinosa et al. | .............. | 251/149.6 |
| 4,512,551 A | 4/1985 | Dalferth | | |
| 4,726,395 A * | 2/1988 | Howes et al. | ................. | 251/337 |
| 4,796,860 A * | 1/1989 | Diel | .............................. | 251/297 |
| 4,940,206 A | 7/1990 | Chung-Shan | | |
| 5,065,700 A | 11/1991 | Cross | | |
| 5,195,721 A * | 3/1993 | Akkerman | ............... | 251/129.13 |
| 5,203,376 A | 4/1993 | Chung-Shan | | |
| 5,286,000 A | 2/1994 | Katz | | |
| 5,295,907 A * | 3/1994 | Akkerman | ....................... | 251/81 |
| 5,704,397 A | 1/1998 | Lu | | |
| 6,152,165 A * | 11/2000 | Fukuda | ......................... | 251/291 |
| 6,196,266 B1 * | 3/2001 | Breda | ....................... | 137/625.11 |
| 6,739,572 B2 | 5/2004 | Shen et al. | | |
| 6,942,195 B2 | 9/2005 | Kao | | |
| 7,143,997 B2 | 12/2006 | Kao | | |
| 2003/0015678 A1 * | 1/2003 | Kagomoto et al. | ........... | 251/148 |

\* cited by examiner

*Primary Examiner* — John Bastianelli
(74) *Attorney, Agent, or Firm* — Harris, Shelton, Hanover & Walsh

(57) ABSTRACT

A rod activated water valve includes a valve base that mates with a standard water faucet. One end of the valve base attaches to a cylindrical valve housing which has an inward protruding lip, at least two key holes at a bottom end and an outer groove. A rod activated valve mechanism is housed within the cylindrical valve housing. A cylindrical outer sleeve is rotatably held onto the cylindrical valve housing by a C-shaped spring member and substantially covers the cylindrical valve housing thereby preventing removal of the cylindrical outer sleeve from the cylindrical valve housing and allowing free rotation of the cylindrical outer sleeve with respect to the cylindrical valve housing. A tool is required to be inserted into the key holes for installation and removal of the rod activated water valve with tamper-resistant security feature to/from a faucet.

15 Claims, 10 Drawing Sheets

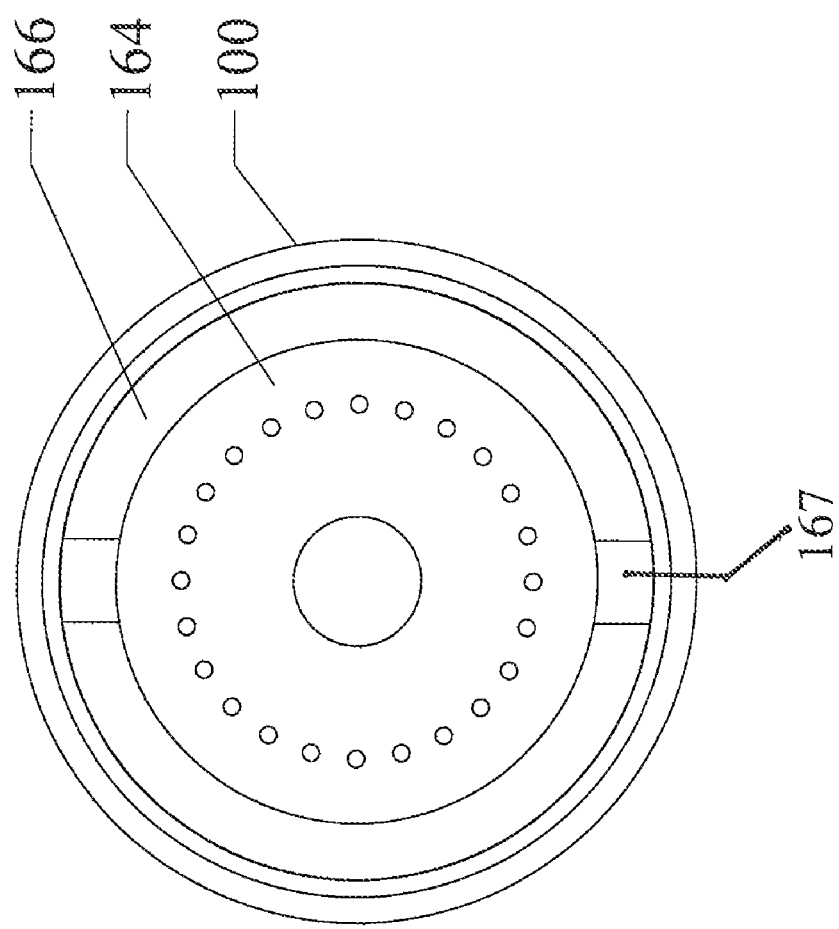

ROD ACTIVATED VALVE FOR SAVING WATER WITH TAMPER-RESISTANT SECURITY FEATURE

RELATED APPLICATIONS

This application is a continuation-in-part of co-pending application Ser. No. 12/109,967 filed Apr. 25, 2008.

FIELD OF THE INVENTION

This invention relates to the field of water valves and more particularly to a rod activated water valve for installation on standard water faucets.

BACKGROUND OF THE INVENTION

Although the earth's supply of fresh water is constantly refreshed by the evaporation/condensation process, clean water is a scarce commodity in certain places, especially during drought conditions. Many families waste water unnecessarily. Even those who try to conserve water may unintentionally waste water. For example, when brushing one's teeth, most people don't shut off the water while they brush. Instead, the water is turned on, the toothpaste applied to the brush, the teeth are brushed and then rinsed, and then the water is turned off.

To reduce the waste of water during processes such as this, several devices have been deployed. For example, in public restrooms, proximity sensors interface with a solenoid valve are used to allow water flow only when a person's hands are beneath the faucet. Unfortunately, such a system requires plumbing changes that are not economically viable for most homeowners.

Another device for reducing the waste of water is a wand activated dispensing valve as described in U.S. Pat. No. 5,286,000 to Katz which is hereby incorporated by reference. In this, the standard aerator is removed from the faucet and replaced with an aerator/valve combination. The valve in this device is actuated by a wand or shaft. When the user needs water, the wand is displaced in a sideward direction, thereby opening a valve within the aerator/valve assembly. When the user is finished, the wand returns to its at-rest position and the flow of water ceases. Unfortunately, the aerator/valve described is not reliable and soon fails under normal use situations. Additionally, due to the design of the valve, a phenomena known as water hammer occurs when the valve closes. Water hammer often occurs when the flow of water is abruptly halted.

What is needed is a rod activated valve that is reliable and reduces water hammer.

SUMMARY OF THE INVENTION

In one embodiment, a rod activated water valve is disclosed including a valve base, a top end of which is threaded on an outside surface for mating with a standard water faucet thread arrangement. The valve base has a recess at the top end for capturing a recessed washer, a second end of the valve base has a threaded outside surface. A top end of a housing has a threaded inside surface for interfacing with the threaded outside surface of the second end of the valve base and has an inner diameter and an inward protruding lip at a housing bottom end. A water flow chamber has a solid cylindrical outer surface and a substantially flat, foraminous surface at one end with a centrally located aperture with a lip in its top edge. The end of the water flow chamber is held within the housing by the inward protruding lip. A rod passes through the aperture and is held in place by a rod head. A valve seat has an upper flow guide with water flow openings, an upper valve plate and an upper valve plate o-ring. The upper flow guide and upper valve plate are held within the water flow chamber and the upper valve plate o-ring interfaces within the lip of the water flow chamber. A groove of the upper valve plate fits within the second end of the valve base and the upper valve plate and the upper flow guide have a valve aperture. A valve stem fits within the valve aperture and has an enlarged end, an angled body and a valve base. A valve o-ring fits on the valve stem resting against the enlarged end such that the valve o-ring, the enlarged end of the valve stem and the upper valve plate selectively block a flow of water through the valve aperture. The valve base interfaces with the rod head such that lateral movement of the rod displaces the rod head, thereby pushing upward on the valve base resulting in the valve stem lifting to permit water to pass between the valve stem and the valve aperture.

In another embodiment, an improved rod activated water valve is disclosed including a rod of which one end has a rod head. The improvement includes a valve stem fitted within a valve aperture. The valve stem has an enlarged end, an angled body and a valve base. A valve o-ring is fitted on the valve stem resting against the enlarged end such that the enlarged end of the valve stem and the valve o-ring selectively block the flow of water through the valve aperture. The valve base interfaces with the rod head such that lateral movement of the rod displaces the valve head, thereby pushing upward on the valve base resulting in the valve stem lifting to permit water to pass between the valve stem and the valve aperture. Upon abatement of the lateral movement, the angled body enables a gradual reduction of the flow of water, thereby reducing water hammer.

In another embodiment, a rod activated water valve is disclosed including a valve base, a top end of which is threaded for mating with a standard water faucet thread arrangement. The top end of the valve base has a recess for capturing a recessed washer for preventing leaks between the water valve and the water faucet. A second end of the valve base has a threaded outside surface. A top end of a housing has a threaded inside surface for attaching to the threaded outside surface of the valve base. The housing has an inner diameter and an inward protruding lip at a bottom end. The rod activated water valve includes a water flow chamber with a solid cylindrical outer surface and a substantially flat foraminous surface at one end. An aperture is located substantially central to the flat foraminous surface and a top edge of the water flow chamber has a washer-holding lip. A rod having a rod head at one end passes through the aperture and is held by the rod head. There is a device for selectively blocking the flow of water from the standard water faucet to the water flow chamber activated by the rod head, providing for a gradual stopping of the flow of water, thereby reducing water hammer.

BRIEF DESCRIPTION OF THE DRAWINGS

The invention can be best understood by those having ordinary skill in the art by reference to the following detailed description when considered in conjunction with the accompanying drawings in which:

FIG. 8 illustrates a bottom view of a security mechanism of the rod activated valve.

DETAILED DESCRIPTION OF THE INVENTION

Figure 1:
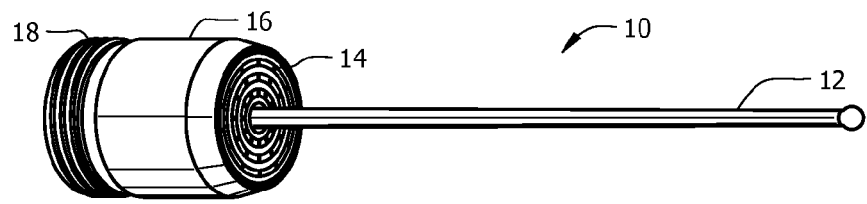
FIG. 1 illustrates a conventional wand activated valve of the prior art.

Reference will now be made in detail to the presently preferred embodiments of the invention, examples of which are illustrated in the accompanying drawings. Throughout the following detailed description, the same reference numerals refer to the same elements in all figures.

Referring to FIG. 1, a conventional wand activated valve 10 of the prior art is shown. The wand activated valve 10 includes a cylindrical valve housing 16 that has a threaded end 18 which is fitted onto the threaded end of a faucet spout (not shown) and an aerator grill 14 at the opposite end. A wand 12 is suspended from the aerator grill 14 along the directional path of water that discharges from the wand activated valve 10. The wand activated valve of the prior art 10 has elongated openings in the aerator grill 14 which leads to failures. Likewise (not shown), the aerator internal cylindrical surface includes elongated openings which also leads to failures. Additionally, there are no grooves or cavities for holding washers in place and, therefore, the wand activated aerator 10 of the prior art often fails due to misaligned washers. The construction of the valve stem and aperture of the prior art wand activated valve 10 often causes water hammer due to rapid stopping of the water flow.

Figure 2:
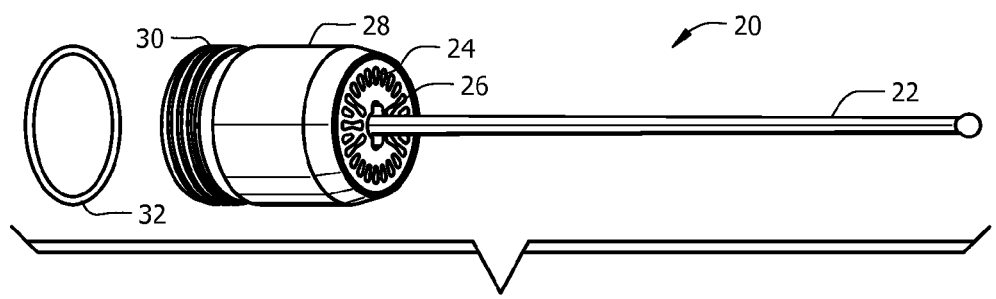
FIG. 2 illustrates another conventional wand activated valve of the prior art.

Referring to FIG. 2, another conventional wand activated valve 20 of the prior art is shown. This wand activated valve 20 includes a cylindrical valve housing 28 that has a threaded end 30 which is fitted onto the threaded end of a faucet spout (not shown) and an aerator grill 24 at the opposite end. A wand 22 is suspended from the aerator grill 24 along the directional path of water that discharges from the wand activated valve 20. A washer 32 rests on the threaded end 30 for reducing leaks between the threaded end 30 and the faucet spout. Since the washer 32 is free to move during installation, it is often misaligned leading to leakage. The wand activated valve 20 of the prior art has elongated openings in the aerator grill 24 which leads to failures. Likewise (not shown), the aerator internal cylindrical surface includes elongated openings which also leads to failures. Additionally, there are no grooves for holding internal washers in place and, therefore, the wand activated aerator 20 of the prior art often fails due to misalignment of such washers.

In this version of the prior art, the wand 22 passes through an irregular opening 26 in the aerator grill 24 such that the wand 20 is turnable, such that a bulge on the wand 20 will catch on the surface of the aerator grill 24, thereby locking the wand activated valve 20 in the "on" position. This construct along with the shape and size of the holes in the aerator grill 24, often causes failure due to stress caused by over-pushing of the wand 20.

Figure 3:
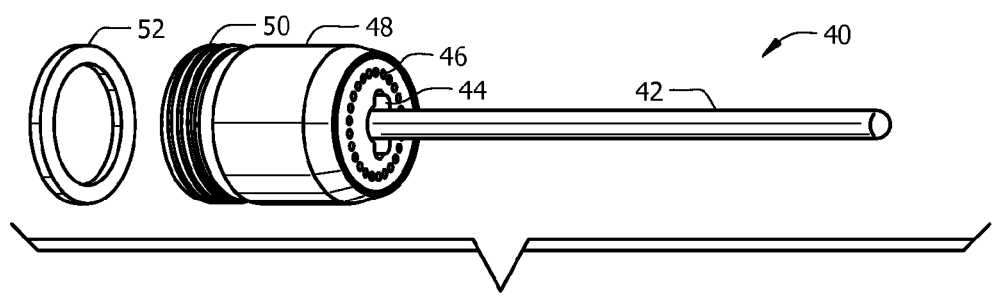
FIG. 3 illustrates another conventional wand activated valve of the prior art.

Referring to FIG. 3, another conventional wand activated valve 40 of the prior art is shown. This wand activated valve 40 includes a cylindrical valve housing 48 that has a threaded end 50 which is fitted onto the threaded end of a faucet spout (not shown) and an aerator grill 46 at the opposite end. A wand 42 is suspended from the aerator grill 46 along the directional path of water that discharges from the wand activated valve 40. A washer 52 rests on the threaded end 50 for reducing leaks between the threaded end 50 and the faucet spout. Since the washer 52 is free to move during installation, it is often misaligned leading to leakage. The aerator internal cylindrical sidewall surface (not shown) includes elongated openings which also lead to failures. Additionally, there are no grooves for holding internal washers in place, and therefore, the wand activated aerator 40 of the prior art often fails due to misalignment of such washers. The structure of the valve stem and valve aperture often causes water hammer.

In this version of the prior art, the wand 42 passes through an irregular opening 44 in the aerator grill 46 such that the wand 20 is turnable, such that a bulge on the wand 40 will catch on the surface of the aerator grill 46, thereby locking the wand activated valve 40 in the "on" position. This construct, along with the shape and size of the holes in the aerator grill 46, often causes failure due to stress caused by over-pushing of the wand 40.

Figure 4:
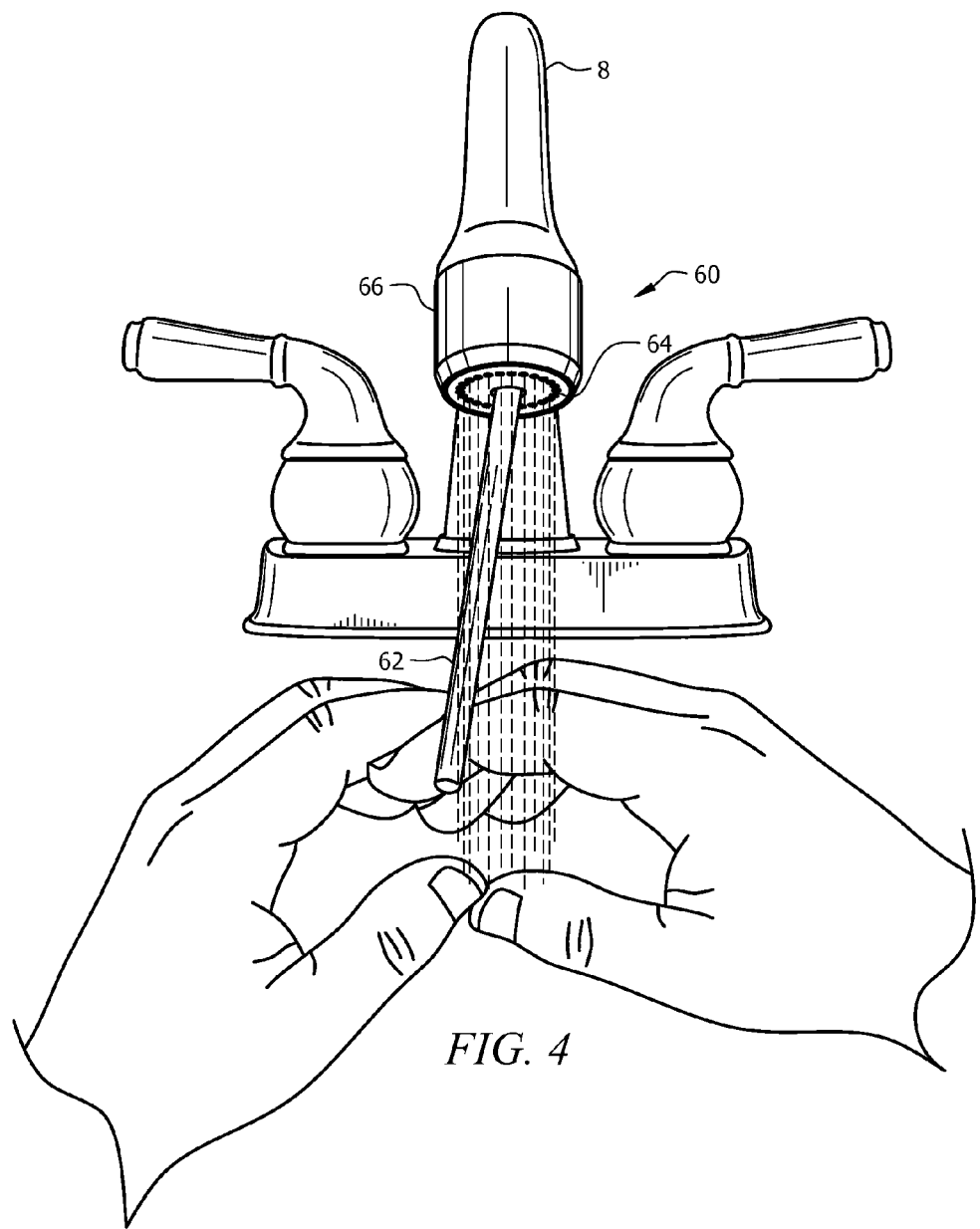
FIG. 4 illustrates a conventional faucet set used for dispensing hot and cold water adapted with an embodiment of the present invention.

Referring to FIG. 4, a conventional faucet set 8 used for dispensing hot and cold water is shown. The faucet set 8 includes a spout having an internally threaded open discharge end, and hot and cold manual control valves. The spout of the faucet is fitted with the rod activated valve 60 of the invention. The housing 66 has a threaded end 70 (not visible) which is fitted onto the threaded end of the faucet spout, and has a rod 62 that is suspended from the lower surface of the valve 64 along the path of the water discharged. As shown, the rod 62 is displaced, therefore, the water is flowing from the rod activated valve 60.

Figure 5:
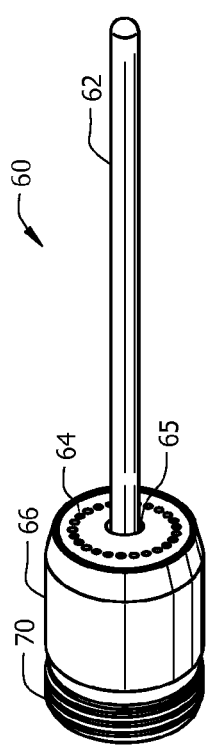
FIG. 5 illustrates a rod activated valve of the present invention.

Referring now to FIG. 5, a rod activated valve 60 of the present invention is shown. Visible is the housing 66. At one end of the housing 66 is a foraminous surface 64 of the water flow chamber 67 (see FIG. 6) which is held in place by a narrowing diameter of the housing 66 at its lower end. The foraminous surface 64 has a central through aperture 65 which receives the rod 62. The aperture 65 is preferably centrally located on the lower foraminous surface 64. Holes in the lower foraminous surface 64 are preferably circular for reliability purposes. The top end of the rod activated valve 60 is threaded 70 for mating with the threads of a standard faucet (not shown). In some embodiments, the rod is made of stiff plastic while in other embodiments, the rod is made of metal such as steel, plated steel, stainless steel and the like.

Figure 6:
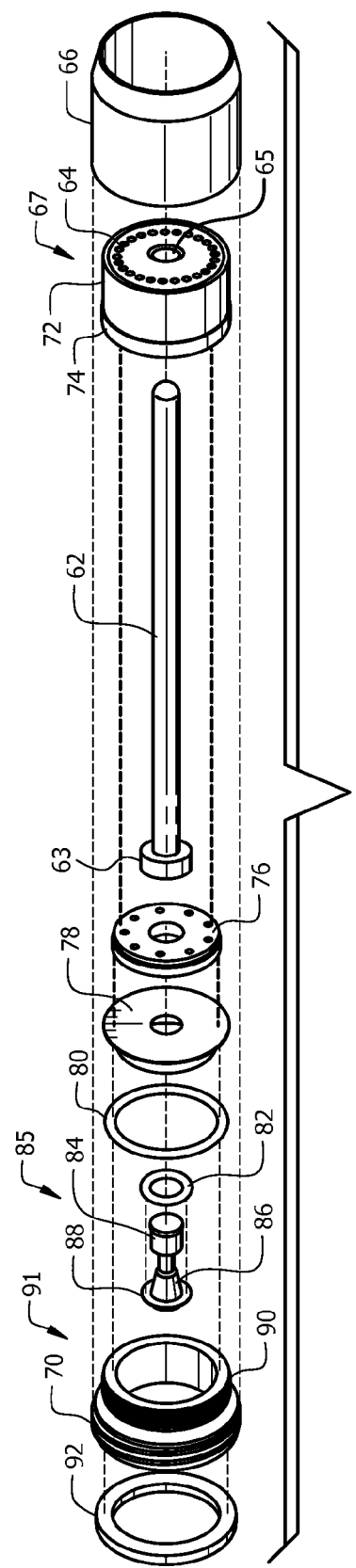
FIG. 6 illustrates an exploded view of the rod activated valve of the present invention.

Referring now to FIG. 6, an exploded view of the rod activated valve 60 of the present invention is shown. A substantially cylindrical housing 66 has at one end a water flow chamber 67 having a lower foraminous surface 64 and a central through aperture 65 which receives the rod 62. The aperture 65 is preferably centrally located on the lower foraminous surface 64. The water flow chamber 67 has a substantially solid, cylindrical side surface 72 for fitting within the housing 66. A lip 74 is formed on the side surface 72 for holding the upper valve plate 0-ring 80 in its correct position.

A upper flow guide 76 and a upper valve plate 78 having a circumferential groove both fit within the water flow chamber 67. The smaller diameter of the upper valve plate 78 fits within the inner diameter of the base 91. The valve stem 85 has an enlarged end 88. The valve o-ring 82 fits over the valve stem 85 and rests against the enlarged end 88. The angled surface 86 interfacing with the enlarged end 88 provides for a gradual reduction of water flow when the valve 60 is closed, thereby reducing water hammer. At the opposite end of the valve stem 85 is a valve base 84. The valve base 84 interfaces with the rod head 63 such that when the rod 62 is displaced, the edge of the rod head 63 pushes against the valve base 84 and lifts the valve stem 85 out of its seat on the upper valve plate 78, thereby allowing water to flow. The lip 74 of the water flow chamber 67 interfaces with the outer edge of the upper valve plate 78.

The top end of the rod activated valve 60 has a base 91 with threads 90 for attaching the housing 66 and threads 70 for mating with the threads of a standard faucet (not shown). A recessed washer 92 fits within a recess 94 (see FIG. 7) at the top end of the base 91. By fitting the recessed washer 92 in a recess 94, the recessed washer 92 is held in position while the rod activated valve 60 is installed into a faucet spout.

Figure 7:
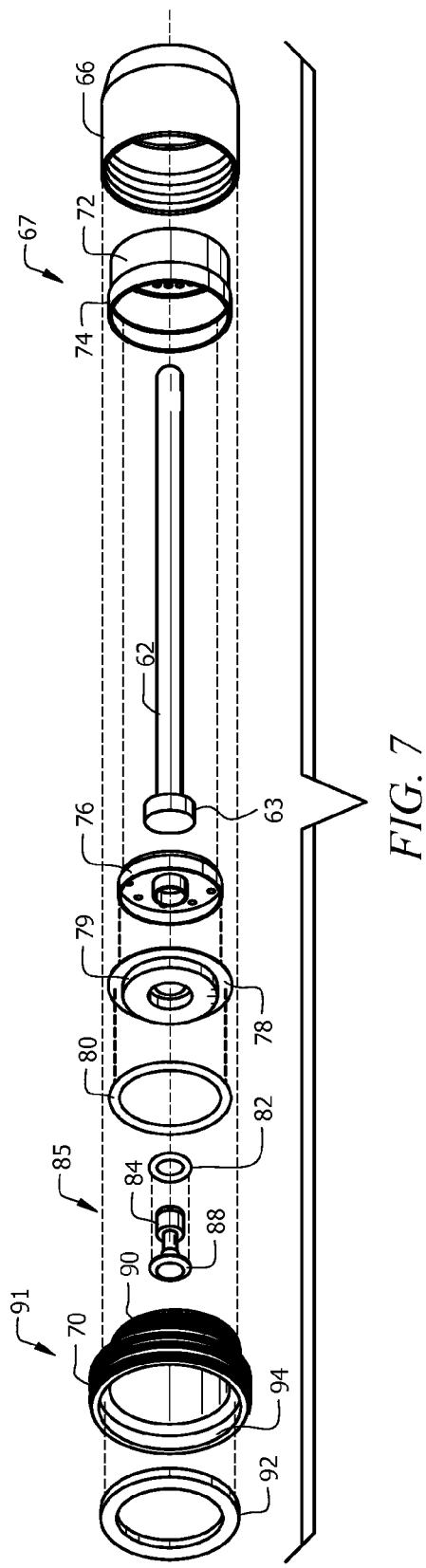
FIG. 7 illustrates an exploded view of the rod activated valve of the present invention.
Figure 9C:
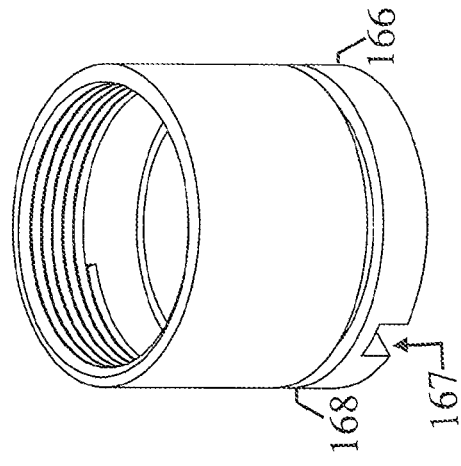
FIG. 9C illustrates a top perspective view of an inner sleeve of the security mechanism of the rod activated valve.
Figure 9B:
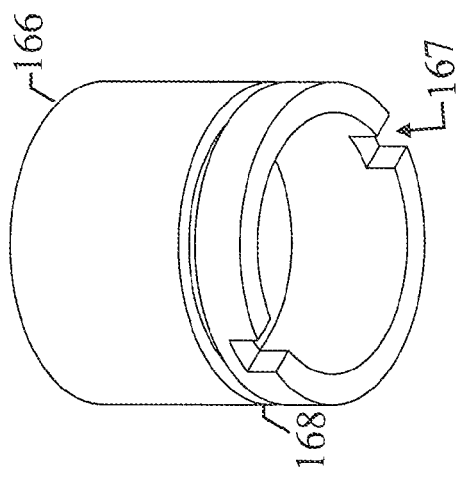
FIG. 9B illustrates a bottom perspective view of an inner sleeve of the security mechanism of the rod activated valve.
Figure 9A:
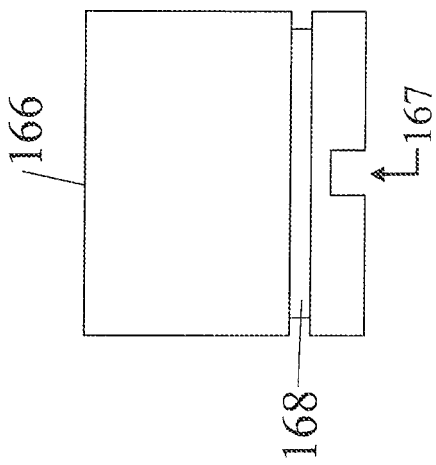
FIG. 9A illustrates a side plan view of an inner sleeve of the security mechanism of the rod activated valve.
Figure 10B:
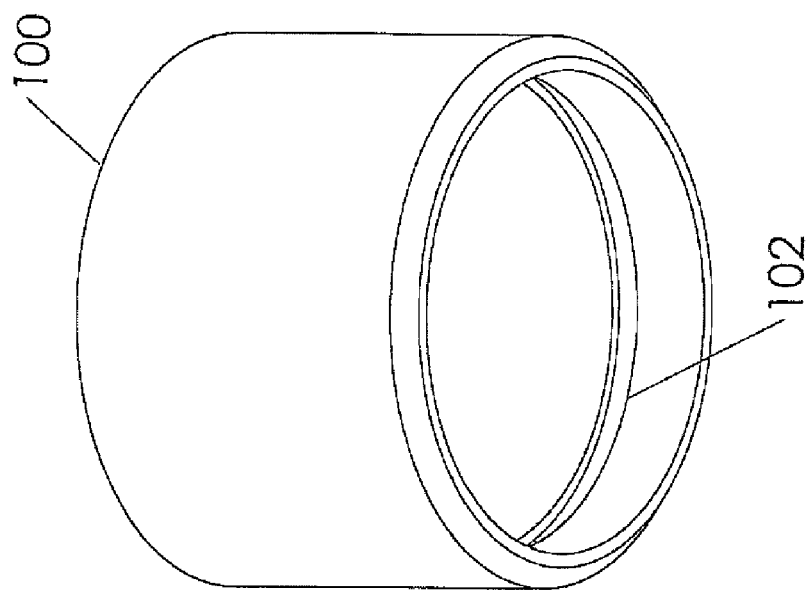
FIG. 10B illustrates a bottom perspective view of an outer sleeve of the security mechanism of the rod activated valve.
Figure 10A:
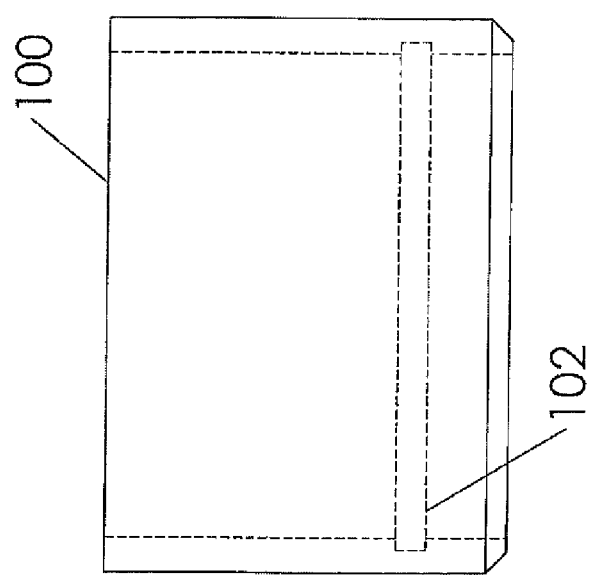
FIG. 10A illustrates a side plan view of an outer sleeve of the security mechanism of the rod activated valve.
Figure 11:
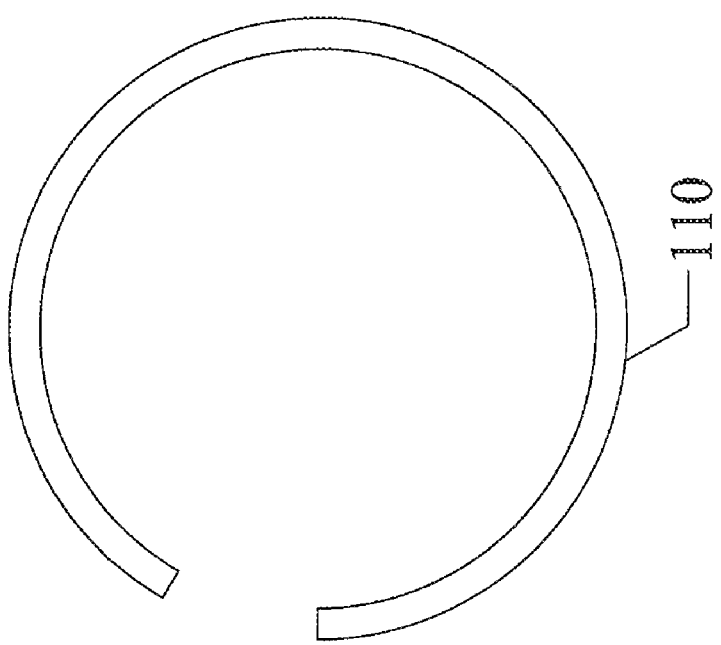
FIG. 11 illustrates a retaining spring of the security mechanism of the rod activated valve.

Referring now to FIG. 7, an exploded view of the rod activated valve 60 of the present invention is shown from the top. A substantially cylindrical housing 66 has at one end a water flow chamber 67 having a lower foraminous surface 64, and a central through aperture 65 (not visible) which receives the rod 62. The aperture 65 is preferably centrally located on the lower foraminous surface 64. The water flow chamber 67 has a substantially solid, cylindrical side surface 72 for fitting within the housing 66. A lip 74 is formed on the side surface 72 for holding the upper valve plate o-ring 80 in its correct position.

An upper flow guide 76 and the upper valve plate 78, having a circumferential groove, both fit within the water flow chamber 67. The smaller diameter of the upper valve plate 78 fits within the inner diameter of the base 91. The valve stem 85 has an enlarged end 88. The valve o-ring 82 fits over the valve stem 85 and rests against the enlarged end 88. The angled surface 86 interfacing with the enlarged end 88 provides for a gradual reduction of water flow when the valve 60 is closed, thereby reducing water hammer. At the opposite end of the valve stem 85 is a valve base 84. The valve base 84 interfaces with the rod head 63 such that when the rod 62 is displaced, the edge of the rod head 63 pushes against the valve base 84 and lifts the valve stem 85 out of its seat on the upper valve plate 78, thereby allowing water to flow. The lip 74 of the water flow chamber 67 interfaces with the outer edge of the upper valve plate 78.

The top end of the rod activated valve 60 has a base 91 with threads 90 for attaching the cylindrical housing 66 and threads 70 for mating with the threads of a standard faucet (not shown). A recessed washer 92 fits within a recess 94 at the top end of the base 91. By fitting the recessed washer 92 in a recess 94, the recessed washer 92 is held in position while the rod activated valve 60 is installed into a faucet spout.

Referring to FIGS. 8-11, a tamper-resistant security mechanism will be described. The rod-activated valve for saving water often becomes a target for unwanted removal. For example, in public places, vandals often clog a drain and leave water running so it floods a washroom. The rod-activated valve system prevents such vandalism since water stops flowing when the user stops pressing on the bar. Unfortunately, vandals often resort to carrying pliers and removing a rod-activated valve system to thwart this very feature. To prevent unwanted removal, some embodiments of the rod activated valve for saving water have a tamper prevention mechanism that prevents unwanted removal and uses a special tool that enables removal.

As shown from the bottom in FIG. 8, the rod-activated valve for saving water with security feature has an outer sleeve 100 and an inner sleeve 166 which is actually a modified cylindrical valve housing 66 (see FIG. 7). The bottom surface of the upper flow guide 164 is visible the same as or similar to the upper flow guide 76 shown in FIG. 7. The inner sleeve 166 attaches to the faucet and the outer sleeve 100 freely rotates around the inner sleeve 166. Because of the free movement of the outer sleeve 100 over the inner sleeve 166, the rod-activated valve for saving water with security feature cannot be removed by grasping the outer sleeve 100 and turning, since this will not result in turning of the inner sleeve 166 and hence, not disengage with the faucet. To facilitate the rotation, the inner diameter of the outer sleeve 100 is slightly larger than the outer diameter of the inner sleeve 166.

Figure 12:
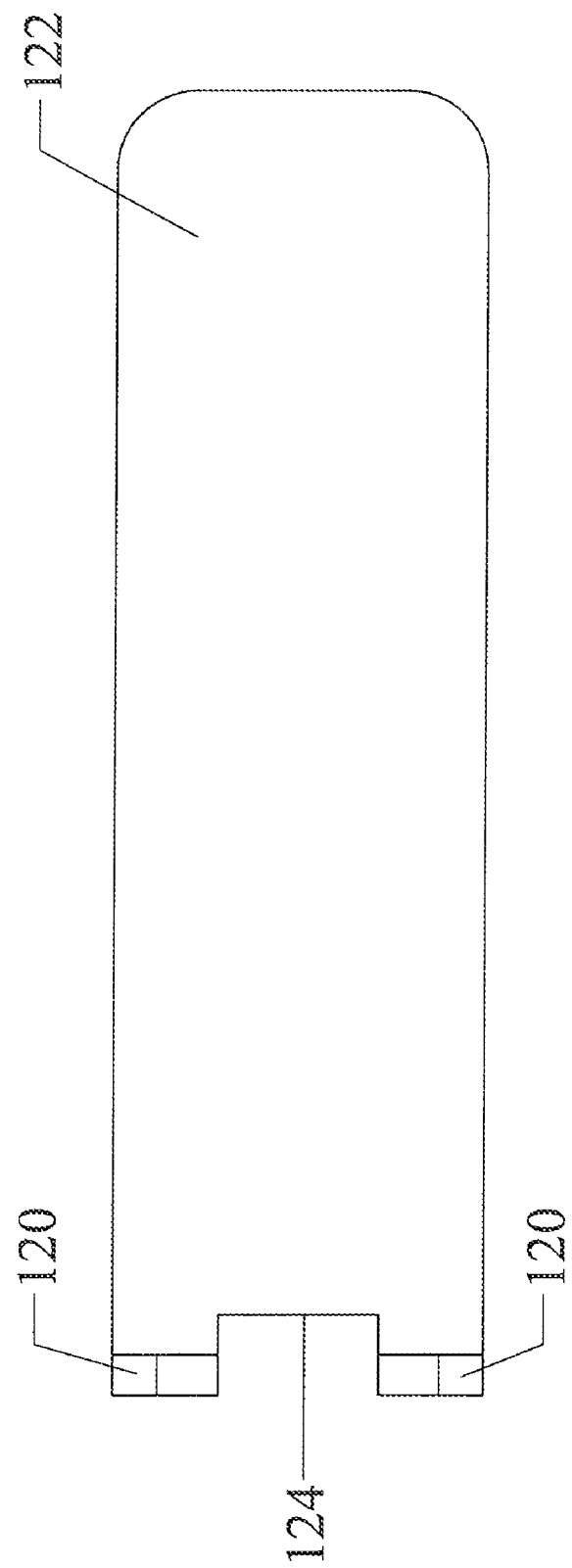
FIG. 12 illustrates a plan view of an exemplary tool for removing the security mechanism of the rod activated valve.
Figure 13:
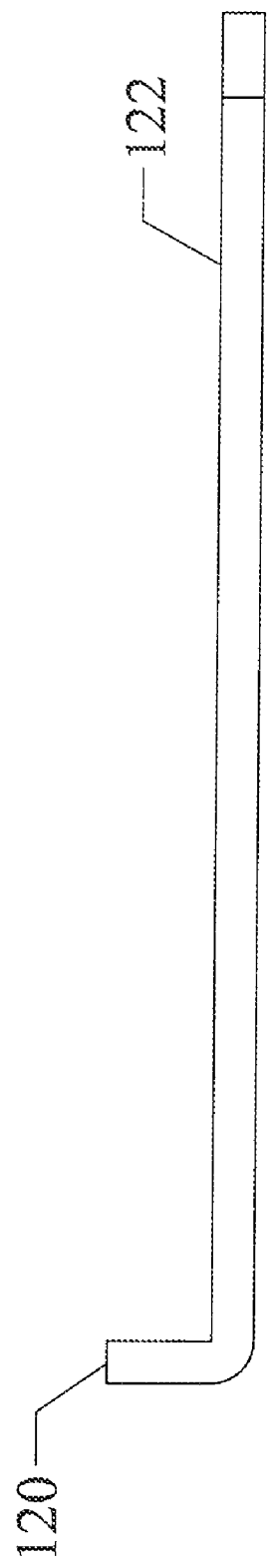
FIG. 13 illustrates a side view of an exemplary tool for removing the security mechanism of the rod activated valve.

Although any number of key holes 167 is anticipated, the example shown in FIG. 8 has two key holes 167. The key holes 167 are cut or formed in the inner sleeve 100, preferably before the inner sleeve 166 is interfaced to the outer sleeve 100. The key holes 167 accept a tool or key 122 (see FIGS. 12 and 13) for installation and removal of the rod-activated valve for saving water with security feature. In that, tips 120 the tool/key 122 are interface with the key holes 167. After inserting the tips 120 of the tool/key 122 into the key holes 167, the tool/key 122 is used to rotate the inner sleeve 100, thereby securing or removing the inner sleeve 100 from the faucet for installation or removal of the rod-activated valve for saving water with security feature.

As shown from the bottom in FIGS. 9A, 9B, 9C, 10A, 10B and 11, the inner sleeve 166 of the rod-activated valve for saving water with security feature has a groove 168 that substantially runs circumferential around the outer surface, substantially perpendicular to the axis of the rod-activated valve assembly. The groove 168 is wide and deep enough to accept the C-shaped spring 110 such that a portion of the C-shaped spring 110 protrudes from the groove 168 and engages with an inner groove 102 of the outer sleeve 100. In this way, once assembled together, the C-shaped spring 110 sits partially in the groove 168 of the inner sleeve 166 and partially within the inner groove 102 of the outer sleeve 100, thereby preventing the outer sleeve 100 from being removed from the inner sleeve 166 and allowing the outer sleeve 100 to freely rotate around the inner sleeve 166. It is anticipated that the outer sleeve 100 be made of a sturdy material such as steel, brass or copper so that the outer sleeve 100 is not easily compresses by a tool such as channel locks, thereby defeating the security system.

The C-shaped spring 110 is typically made of metal such as steel, brass, copper, etc.

To facilitate installation and removal of the rod-activated valve for saving water with security feature, the inner sleeve 166 has key holes 167. The key holes 167 accept a tool or key 122 for installation and removal of the rod-activated valve for saving water with security feature. In the example shown, there are two key holes 167 and the tool/key 122 has two tips 120 positioned to interface with the two key holes 167. After inserting the tips 120 of the tool/key 122 into the matching key holes 167, the tool/key 122 is rotated, thereby rotating the inner sleeve 100 and securing or removing the inner sleeve 100 from the faucet for installation or removal of the rod-activated valve for saving water with security feature.

To clear the activation rod 62, the tool/key 122 has a cutout 124. Any shape or size of cutout 124 is anticipated.

Equivalent elements can be substituted for the ones set forth above such that they perform in substantially the same manner in substantially the same way for achieving substantially the same result.

It is believed that the system and method of the present invention and many of its attendant advantages will be understood by the foregoing description. It is also believed that it will be apparent that various changes may be made in the form, construction and arrangement of the components thereof without departing from the scope and spirit of the invention or without sacrificing all of its material advantages. The form herein before described being merely exemplary and explanatory embodiment thereof. It is the intention of the following claims to encompass and include such changes.

What is claimed is:

1. A rod activated water valve with security feature comprising:
    a valve base, a top end of the valve base being threaded on an outside surface for mating with a standard water faucet thread arrangement, a second end of the valve base having a threaded outside surface;
    a cylindrical valve housing, a top end of the cylindrical valve housing having a threaded inside surface, the threaded inside surface interfacing with the threaded outside surface of the second end of the valve base, the cylindrical valve housing having an inner diameter and the cylindrical valve housing having an inward protruding lip at a housing bottom end, the cylindrical valve housing having an outer circumferential groove on an outside surface, an edge surface of the cylindrical valve housing distal from the threaded inside surface having at least two key cutouts;
    a cylindrical outer sleeve, the cylindrical outer sleeve having an inner circumferential groove on an inside surface, the inner circumferential groove corresponding to the outer circumferential groove;
    a C-shaped spring member springedly held within the outer circumferential groove and held within the inner circumferential groove, rotatably holding the outer sleeve in position over the cylindrical valve housing, thereby preventing removal of the cylindrical outer sleeve from the cylindrical valve housing and allowing free rotation of the cylindrical outer sleeve with respect to the cylindrical valve housing, thereby requiring a tool be inserted into the key cutouts for installation and removal of the rod activated water valve with security feature to/from a faucet;
    a water flow chamber having a solid cylindrical outer surface, the water flow chamber having a substantially flat foraminous surface at one end, an aperture located substantially central to the flat foraminous surface, a water flow chamber top edge having a lip, the one end of the water flow chamber held within the cylindrical valve housing by the inward protruding lip;
    a rod having a rod head at one end, the rod passing through the aperture and held in place by the rod base;
    a valve seat having an upper flow guide, upper valve plate and an upper valve plate o-ring, the upper flow guide having water flow openings, the upper flow guide and upper valve plate held within the water flow chamber, the upper valve plate interfacing within the lip of the water flow chamber, a groove of the upper valve plate fitting within the second end of the valve base, the upper flow guide and the upper valve plate having a valve aperture;
    a valve stem fitted within the valve aperture, the valve stem having an enlarged end, an angled body and a valve base end;
    a valve o-ring fitted on the valve stem resting against the enlarged end such that the valve o-ring, the enlarged end of the valve stem and the upper valve plate selectively block a flow of water through the valve aperture;
    whereas the valve base interfaces with the rod head such that lateral movement of the rod displaces the rod head, thereby pushing upward on the valve base resulting in the valve stem lifting thereby enabling a flow of water between the valve stem and the valve aperture.

2. The rod activated water valve of claim 1, wherein the rod is made of metal.

3. The rod activated water valve of claim 1, wherein a top end of the valve base includes a recess for capturing a recessed washer.

4. A rod activated valve assembly with security feature, the rod activated valve having a rod activated water valve, the security feature comprising:
    a cylindrical inner sleeve, the cylindrical inner sleeve containing and housing the rod activated water valve, the cylindrical inner sleeve having an outer circumferential groove on an inside surface, a first end of the cylindrical inner sleeve having threads that mate with threads of a faucet and a distal second end of the cylindrical inner sleeve having at least two key holes for installation and removal;
    a cylindrical outer sleeve, the cylindrical outer sleeve having an inner circumferential groove on an inside surface, the inner circumferential groove corresponding to the outer circumferential groove;
    a C-shaped spring member, springedly held within the outer circumferential groove and held within the inner circumferential groove, rotatably holding the outer sleeve in position over the cylindrical inner sleeve, thereby preventing removal of the cylindrical outer sleeve from the cylindrical inner sleeve and allowing free rotation of the cylindrical outer sleeve with respect to the cylindrical inner sleeve, thereby requiring a tool be inserted into the key holes for installation and removal of the rod activated water valve with security feature to/from the faucet.

5. The rod activated valve assembly of claim 4, wherein the rod activated water valve includes a valve assembly that reduces water hammer.

6. The rod activated valve assembly of claim 4, wherein a rod extending from the rod activated water valve is made of metal.

7. The rod activated water valve of claim 1, wherein the angled body of the valve stem reduces water hammer by gradual reduction of the flow of water.

8. The rod activated water valve of claim 1, wherein the upper flow guide has a foraminous surface for passing water from the valve aperture to the water flow chamber.

9. The rod activated water valve of claim 1, wherein the flat foraminous surface of the water flow chamber has round holes for structural integrity.

10. A rod activated water valve comprising:
    a valve base, a top end of the valve base being threaded on an outside surface for mating with a standard water faucet thread arrangement, a second end of the valve base having a threaded outside surface;

a cylindrical valve housing, a top end of the cylindrical valve housing having a threaded inside surface, a bottom surface of the cylindrical valve housing having at least two key holes, an outer surface of the cylindrical valve housing having a circumferential groove, the threaded inside surface interfacing with the threaded outside surface of the valve base, the cylindrical valve housing having an inner diameter and the bottom end of the cylindrical valve housing having an inward protruding lip;

a cylindrical outer sleeve, the cylindrical outer sleeve having an inner circumferential groove on an inside surface, the inner circumferential groove corresponding to the outer circumferential groove;

a C-shaped spring member springedly held within the outer circumferential groove and held within the inner circumferential groove, rotatably holding the outer sleeve in position over the cylindrical valve housing, thereby preventing removal of the cylindrical outer sleeve from the cylindrical valve housing and allowing free rotation of the cylindrical outer sleeve with respect to the cylindrical valve housing, thereby requiring a tool be inserted into the key cutouts for installation and removal of the rod activated water valve with security feature to/from a faucet;

a water flow chamber having a solid cylindrical outer surface, the water flow chamber having a substantially flat foraminous surface at one end, an aperture located substantially central to the flat foraminous surface having a lip on a top edge of the water flow chamber;

a rod having a rod head at one end, the rod passing through the aperture and held within the aperture by the rod head; and a means for selectively blocking the flow of water from the standard water faucet to the water flow chamber, the means for selectively blocking the flow of water enables flow of water upon lateral movement of the rod, the means for selectively blocking the flow of water gradually stops the flow of the water upon release of the rod, thereby reducing water hammer.

11. The rod activated water valve of claim 10, wherein the means for selectively blocking the flow of water includes a valve seat having an upper valve plate, a upper valve plate o-ring and a upper flow guide, the upper valve plate and a upper flow guide held within the water flow chamber, the upper valve plate held in the lip of the water flow chamber, a groove of the upper valve plate fitting within the second end of the valve base, the upper flow guide and the upper valve plate having a valve aperture, wherein the upper flow guide has a foraminous surface for passing water from the valve aperture to the water flow chamber.

12. The rod activated water valve of claim 11, wherein the means for selectively blocking the flow of water includes a valve stem fitted within the valve aperture, the valve stem having an enlarged end, an angled body and a valve base.

13. The rod activated water valve of claim 12, wherein the angled body of the valve stem reduces water hammer by gradual reduction of the flow of water.

14. The rod activated water valve of claim 10, wherein the flat foraminous surface of the water flow chamber has round holes for structural integrity.

15. The rod activated water valve of claim 10, wherein the rod is made of metal.

* * * * *